Feb. 26, 1963  F. R. MORTIMER ET AL  3,078,679
PNEUMATIC OPERATING DEVICE
Filed Jan. 23, 1961  2 Sheets-Sheet 1
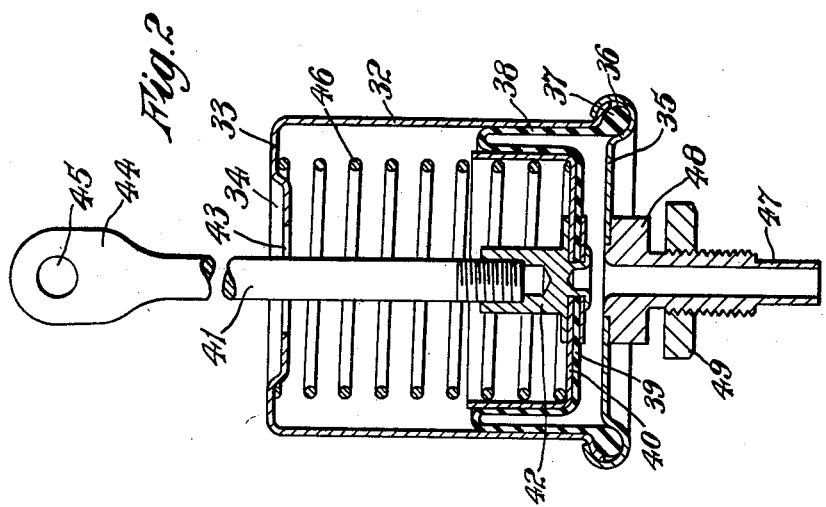
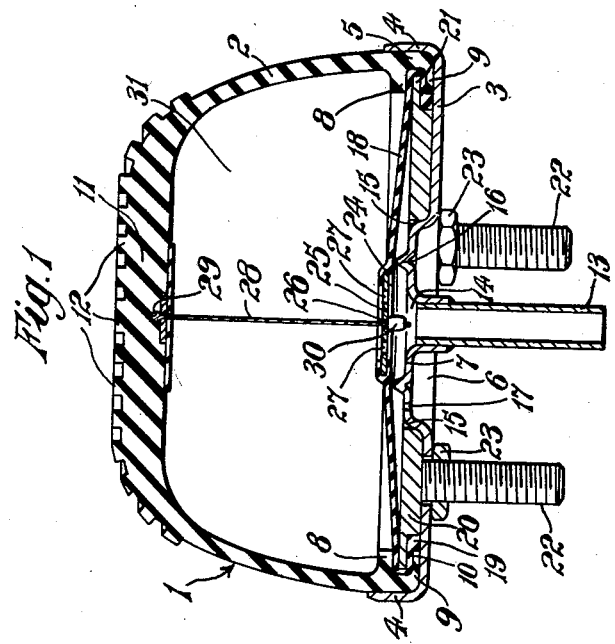
INVENTORS
Frank Radcliffe Mortimer
Edward Alan Cardoe
by Benj. T. Rauba
their attorneys

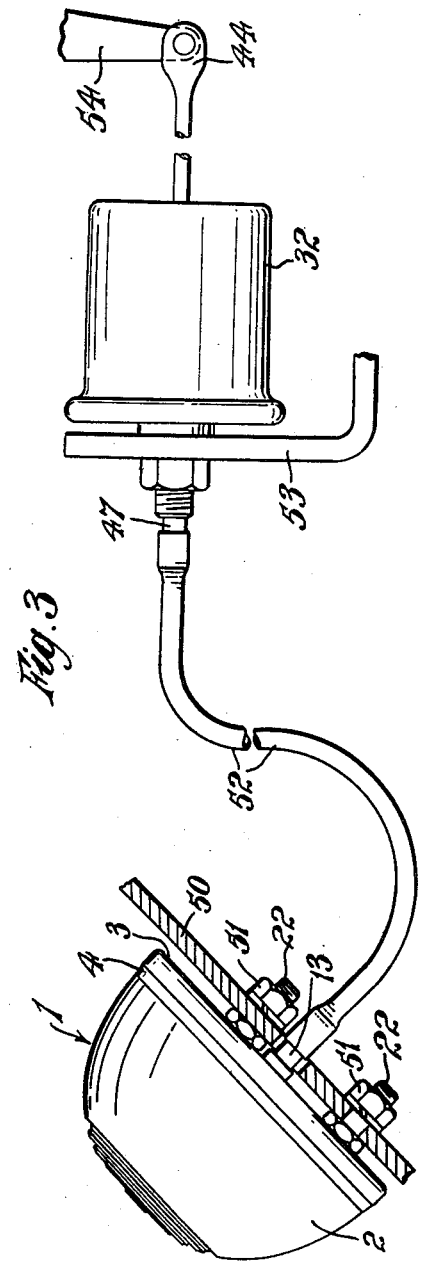

United States Patent Office 3,078,679
Patented Feb. 26, 1963

3,078,679
PNEUMATIC OPERATING DEVICE
Frank Radcliffe Mortimer, Styvechale, and Edward Alan Cardoe, Foleshill, England, assignors to Dunlop Rubber Company Limited, Coventry, England
Filed Jan. 23, 1961, Ser. No. 84,340
Claims priority, application Great Britain Feb. 3, 1960
5 Claims. (Cl. 60—62.6)

This invention relates to a pneumatic operating device and more particularly relates to a low pressure pneumatic device for operating a mechanism such as, e.g. a carburettor throttle.

The invention has for its object the provision of a low pressure pneumatic operating device for mechanisms operable by a small load such as throttles and the like which dispenses with the mechanical linkages and cable now customarily used.

According to the present invention, a pneumatic operating device comprises a deformable pneumatic operating unit, means to seal the interior of the unit from the atmosphere on deformation thereof, and means to transmit air pressure from said unit upon deformation thereof to an actuating unit for a mechanism.

The deformable pneumatic operating unit may comprise any convenient pneumatic unit which provides an adequate cross-sectional area, for example, such a unit as a sac, bellows, diaphragm or the like. Preferably the unit comprises a moulded, substantially part-spherical hollow resilient sac of rubber or the like, but a cylindrical bellows or a bellows of the kind wherein the end-plates are hingedly connected at one end, can be used. It is desirable that the pneumatic operating unit should have sufficient resilience so that after deformation it is returned naturally to its undeformed state with the interior thereof open to the atmosphere.

Usually, the pneumatic operating unit is connected by a small diameter pipe to a slave unit comprising the actuating unit which is, in turn, associated with the throttle or other mechanism which it is intended to actuate. The said pneumatic operating unit is provided with suitable means to seal the interior thereof from atmospheric pressure on deformation of the unit. Generally, the deformation of the pneumatic operating unit is brought about by compression of the sac, bellows, diaphragm or the like and the sealing means is brought into operation at the beginning of the compression. The sealing means may comprise a recuperation valve or any other suitable device, e.g. a rubber sheet or diaphragm held under tension and adapted to abut a valve seat upon full or partial release of tension.

During operation of the pneumatic operating unit, i.e. as the sac or the like is compressed, usually by the foot, the air pressure in the unit increases very slightly and this is transmitted by means of the small diameter pipe to the slave unit. A pressure increase in the said operating unit of up to the order of 1 pound per square inch is contemplated and thus the operating pressures are of a very low order. The diameter of the sac or the like is considerably larger than that of the slave unit to which it is connected, the ratio being, e.g. 4:1, so that adequate movement of the slave unit is obtained for quite small deflections of the operating unit.

The slave unit which comprises the actuating unit for the mechanism preferably comprises a plunger adapted to slide air-tightly in a cylindrical chamber and attached by means of a rod linkage to the mechanism to be actuated. In such a slave unit the plunger is caused to slide in the chamber against resilient means, e.g. a compression spring, normally acting so as to maintain the plunger adjacent the end connected to the pneumatic operating unit. Such movement of the plunger as brought about by an increase in the pressure in the said operating unit causes the rod-linkage to move the throttle linkage of the carburettor. In this form of slave unit the plunger is preferably attached to the inner periphery of a rolling lobe diaphragm, the outer periphery of which is attached to the cylinder adjacent the flexible connection. An alternative form of slave unit may comprise a bellows mechanism, one end of which is fixed and is connected by a small diameter pipe to the pneumatic operating unit, the other end of the slave unit being connected to the throttle spindle by a radius arm so that movement of said end will move the arm to angularly move the butterfly valve of the carburettor.

However, the slave unit may comprise any other suitable pneumatic device. For example, it could comprise a coiled, flat, narrow-section chamber connected at its inner end to the throttle spindle in such a manner that as the chamber is inflated it tends to open out or unwind, like a Bourdon tube, and thus rotate the throttle spindle. Alternatively, it could comprise a flat, narrow-section chamber associated with a part-circular guide and the throttle spindle is provided with a roller co-operating with the chamber and guide in such a manner that as the chamber is inflated the roller is pushed along the guide, thus rotating the throttle spindle. As yet another alternative, the slave unit may comprise a cylindrical bag enclosed within a close-coiled tension spring.

A preferred pneumatic operating device will now be described by way of example with reference to the accompanying drawings in which:

FIGURE 1 is a cross-section of the pneumatic operating unit,

FIGURE 2 is a cross-section of the actuating unit for the mechanism, and

FIGURE 3 shows the assembled pneumatic operating unit and actuating means for a motor-vehicle carburettor, as shown in FIGURES 1 and 2.

The pneumatic operating unit 1 consists of a moulded part-spherical hollow sac 2 of rubber or rubber-like material mounted air-tightly on a metal base plate 3. The base plate 3 is provided with a peripheral rim 4 enclosing the lower end 5 of the sac 2 and has a central upwardly-convex recessed portion 6 having a substantially-flat upper surface 7. The lower end 5 of the sac 2 is extended at 8 and 9 to form a radially-extending groove 10 radially-inwardly of the end 5, while the upper surface of sac 2 has a substantially-flat portion 11 having a tread 12. An outwardly-pointing tube 13 is secured centrally in the base plate 3 in an outwardly-pointing tubular entry port 14 and midway between the tubular entry port 14 and the radially-outward edge 15 of the recessed portion 6, is a circular ridge 16 which acts as a valve seat upstanding from the upper surface 7. A small hole or air vent 17 is provided between the edge 15 and ridge 16.

Positioned internally across the sac 2 is an annular impermeable rubber diaphragm 18 which is sealed at its outer periphery air-tightly with the lower end 5 of the sac 2 and the base plate 3. The outer periphery of the diaphragm 18 has a peripheral rim as shown at 19 which is sealed to the base plate 3 and to the lower end 5 of the sac 2 by means of a metal annular plate 20, having an internal diameter such that it seats on the radially-outward edge 15 of the recessed portion 6 and has an outer peripheral tongue 21 extending radially-outwardly from the plate 20 and projecting into the groove 10 on the lower end 5 of the sac. The outer periphery of the diaphragm 18 is wrapped around the tongue and held in the groove 10 by this means, the plate 20 being secured to the base plate 3 by three studs 22 and nuts 23. The thickness of the plate 20 is such that its upper surface is in alignment with the substantially-flat portion 7 of the base plate 3.

The internal radius of the diaphragm 18 is less than the radius of the circular ridge 16 and is provided at its innermost edge with a radially-outwardly-extending groove 24 in which is placed a metal disc 25 having on a diameter thereof three holes, the centre-most hole 26 being centrally-positioned with respect to the tube 13. The other two holes 27 act as air vents.

When the sac 2 is in its as-moulded uncompressed state, the diaphragm 18 is held under tension away from the ridge 16 by means of a cord 28, usually of nylon, sealed centrally in the flat portion 11 of the sac 2 at 29 and passing through the hole 26. Secured to the lower end of the cord and abutting the lower surface of the disc 25 is a bead or stop 30, the length of the cord between the bead and the flat portion 11 being such as to keep the disc and consequently the diaphragm above the uppermost surface of the rim 16. As the sac 2 is deformed by pressing the flat portion 11 towards the base plate 3, the tension in the cord 28 is relieved and this allows the diaphragm to come into contact and make sealing engagement with the rim 16, whereby the interior 31 of the sac is isolated from the atmosphere.

The actuating unit shown in FIGURE 2 consists of a cylindrical metal body 32 having a closed integral end 33 which has a centrally-inwardly recessed portion 34. The other end of the body is provided with an end plate 35 secured at its outer periphery to the outwardly-flared end of the body 32 so as to form a peripheral groove 36 of almost circular cross-section which forms a seat for the bead 37 of a rolling lobe rubber diaphragm 38. The inner periphery of the diaphragm 38 is sealed centrally at 39 to the lower face of a cup-like hollow plunger 40 of external diameter less than the internal diameter of the cylindrical body 32.

The lower face of the cup-like plunger is parallel to the end plate 35 and is provided centrally with a rod-like extension 41 secured to the plunger 40 by boss 42. The rod-like extension 41 passes through an aperture 43 in the recessed portion 34 of the opposing end 33 of the cylindrical body. The end of the rod 41 remote from the plunger and positioned externally of the cylindrical body is flattened as shown at 44 and provided with a hole 45 which enables the rod to be coupled to the throttle arm of a carburettor.

Normally the plunger 40 is retained closely adjacent the end plate 35 by means of a coiled compression spring 46 acting on the upper surface of the lower face of the plunger 40 and the lower surface of the end 33. A tubular member 47 projects centrally-outwardly from the end plate 35 and is secured in an aperture of the end plate by any suitable means, such as welding or pressing. The tubular member is provided intermediate its ends with a threaded portion and adjacent the end plate 35 is provided with a radial extension 48 abutting the end plate 35. A nut 49 is provided in order that the cylindrical body can be attached by means of a bracket between the nut 49 and radial extension 48 to any convenient part of the vehicle engine or body.

The diaphragm 38 which is air-tightly sealed at 37 in the peripheral groove 36 to the cylindrical body and end plate 35 is of such a length as to envelop the lower surface of the plunger and the sides thereof and to be folded back into contact with the walls of the cylindrical body. Thus as the plunger is caused to move towards the end 33 by air being admitted through the tubular member 47, the diaphragm tends to roll off the plunger sides.

In use, the pneumatic operating unit 1 is bolted to the floor 50 of a motor-vehicle by means of the studs 22 and nuts 51. The sac 2 is connected by means of a flexible nylon pipe 52 attached to the tubular member 13 and to the tubular member 47 of the actuating unit. The cylindrical body is mounted by means of a bracket 53 to a convenient part of the vehicle engine or body and rod 44 pivotably attached to the throttle arm 54. As pressure is applied to the tread portion 12, the upper flat portion 11 of the rubber sac is caused to move towards the base plate, thereby allowing the diaphragm 18 to come into sealing engagement with the rim 16 on the base plate. The interior 31 of the sac 2 is thereby sealed from the atmosphere and further movement of the flat portion of the sac towards the base plate 3 causes a rise in the pressure in the interior 31 which is communicated through flexible tube 52 and tubular member 47 to the actuating unit. The increase in pressure, therefore, acts on the surface of the plunger member 40 so as to move this away from the end plate 35 and towards the end 33 effecting a corresponding movement in the rod member 41 and throttle arm 54.

When pressure is released on the upper flat portion of the sac 2, this, due to its natural resilience, begins to return to its normal shape and lifts the rubber sheet 18 away from the rim 16, by means of cord 28 and bead 30 thereby allowing entry of air into the interior 31 of the sac through the hole 17 in the base plate. The sac is therefore able to return to its original shape quickly. When pressure is released on the surface of the plunger member 40, this returns to its normal position closely adjacent the end plate 35, due to the outward expansion of the spring 46.

A device of the kind described is economical to manufacture and trouble-free to operate. It has all the advantages of a fluid pressure device, i.e. it eliminates linkages, rods or the like, without the disadvantages of hydraulic liquid. It is easily adapted to left or righthand drive and is not affected by movement of the engine on its resilient mountings.

The device of the present invention utilises air at pressures very slightly higher than atmospheric pressure and is adapted to operate engine throttles or other similar services requiring the transmission of only very small loads.

Having now described our invention what we claim is:

1. A pneumatic operating device comprising a deformable, hollow, operating unit, a conduit in free communication with said unit to receive air expelled from said unit on deformation and to return air to said unit on return of said unit from deformation, said unit having an opening to atmosphere from said unit and conduit and means actuated by said unit upon initial deformation to close said opening from said unit and conduit and to release said opening upon return of said unit from deformation, said operating unit comprising a base and a dome-shaped enclosure mounted on said base and formed of a molded, resilient, elastomeric material sealed fluid-tightly on said base and in which said conduit opens into said enclosure through said base and said opening to atmosphere is positioned in said base adjacent to said conduit and said means to close and release said opening comprises a valve between said opening and said enclosure and conduit.

2. The apparatus of claim 1 in which said valve means comprises a valve seat on said base encircling said conduit and between said conduit and said opening and a resilient diaphragm sealed at its perimeter of said enclosure and drawn taut on said valve seat to seal said opening from said conduit and said enclosure, and means connected to the upper part of said dome-shaped enclosure to hold said diaphragm free from said valve seat and to release said diaphragm to seat on said valve seat when said dome shaped enclosure is deformed inwardly.

3. A pneumatic operating device according to claim 2 wherein said means to lift said resilient diaphragm comprises a cord or the like secured at one end to the interior domed end of the sac and at the other end to the diaphragm.

4. The apparatus of claim 2 in which said diaphragm has openings within the perimeter of said valve seat to provide communication between the interior of said dome-shaped enclosure at all positions of said diaphragm.

5. The apparatus of claim 4 in which said means to hold said diaphragm from said valve seat comprises a cord secured at its upper end to said dome-shaped enclosure and extending downwardly to and secured to said diaphragm.

References Cited in the file of this patent

UNITED STATES PATENTS

| | | |
|---|---|---|
| 285,477 | Garsed | Sept. 25, 1883 |
| 1,508,418 | Stewart | Sept. 16, 1924 |
| 2,476,545 | Hayward | July 19, 1949 |
| 2,478,575 | Fitch | Aug. 9, 1949 |
| 2,777,397 | Atkinson | Jan. 15, 1957 |